(12) United States Patent
Schicketanz et al.

(10) Patent No.: US 12,726,087 B2
(45) Date of Patent: Sep. 1, 2026

(54) DEVICE FOR GROUNDING A ROTOR CARRIER

(71) Applicant: ZF Friedrichshafen AG, Friedrichshafen (DE)

(72) Inventors: Jacob Schicketanz, Friedrichshafen (DE); Rayk Gersten, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 112 days.

(21) Appl. No.: 18/790,251

(22) Filed: Jul. 31, 2024

(65) Prior Publication Data

US 2025/0047176 A1 Feb. 6, 2025

(30) Foreign Application Priority Data

Aug. 4, 2023 (DE) ..................... 10 2023 207 497.4

(51) Int. Cl.

*H02K 11/40* (2016.01)
*F16C 19/06* (2006.01)
*F16C 41/00* (2006.01)

(52) U.S. Cl.

CPC .............. *H02K 11/40* (2016.01); *F16C 19/06* (2013.01); *F16C 41/002* (2013.01)

(58) Field of Classification Search

CPC ........ H02K 11/40; H02K 5/1732; H02K 5/04; H02K 5/161; F16C 19/06; F16C 41/002
See application file for complete search history.

(56) References Cited

U.S. PATENT DOCUMENTS

| | | | | |
|---|---|---|---|---|
| 8,183,727 B2 * | 5/2012 | Fee | ........................ | H02K 11/40 310/90 |
| 2021/0293279 A1 * | 9/2021 | Hubert | .................. | F16C 33/586 |

FOREIGN PATENT DOCUMENTS

| | | | |
|---|---|---|---|
| DE | 10360548 A1 | 7/2005 | |
| DE | 10 2015 205 028 | 6/2016 | |
| DE | 10 2020 114 067 | 12/2021 | |
| DE | 102021210017 A1 * | 6/2022 | ............. H02K 11/40 |
| WO | 2020/234148 A1 | 11/2020 | |

OTHER PUBLICATIONS

DE-102021210017-A1_translate (Year: 2022).*
German Patent Office, Search Report issued in German Patent application No. 10 2023 207 497.4 (Jun. 27, 2024).

* cited by examiner

*Primary Examiner* — Tulsidas C Patel
*Assistant Examiner* — Mohammed Ahmed Qureshi
(74) *Attorney, Agent, or Firm* — Secant IP, PLLC

(57) ABSTRACT

A device for grounding a rotor carrier is arranged inside of a grounded housing and includes a rotatable rotor carrier extending in an axial direction, a grounding device, and at least one bearing. The rotor carrier is supported by the at least one bearing. The grounding device is arranged on a housing arm next to the bearing and includes an electrically conductive annular carrier element with a central cut out. The carrier element forms a permanent electrically conductive connection to the housing arm at an inside surface of the carrier element. An electrically conductive sliding contact extends radially outward and forms an electrically conductive connection to the rotor carrier at an outer lateral surface of the sliding contact. By way of the sliding contact and the carrier element, an electrical connection is established between the rotor carrier and the housing.

16 Claims, 2 Drawing Sheets

DEVICE FOR GROUNDING A ROTOR CARRIER

RELATED APPLICATIONS

This application claims the benefit of and right of priority under 35 U.S.C. § 119 to German Patent Application no. 10 2023 207 497.4, filed on 4 Aug. 2023, the contents of which are incorporated herein by reference in its entirety.

FIELD OF THE DISCLOSURE

The invention relates to a device for grounding a rotor carrier, the device comprising a grounded housing and, arranged in the grounded housing a rotor carrier which is mounted to rotate and extends in an axial direction, and further comprising a grounding device and at least one bearing. In addition, the invention relates to an electric machine and a transmission.

BACKGROUND

Electric drive input units/transmissions, for example of electric or hybrid vehicles, usually comprise an electric machine with a stator and a rotor mounted to rotate relative to the stator, which rotor is in turn connected rotationally fixed to a rotor shaft of the electric machine. The rotor shaft can be coupled to a transmission of the motor vehicle in order to transmit a torque. The electric machine, together with the transmission and a power electronic system, can be accommodated in a common housing. During the operation of such an electric machine, the rotor shaft can be excited into the emission of interfering signals.

During the operation of electric machines, so-termed bearing currents occur, i.e., capacitive and circular currents that flow through the bearing and give rise to damage there. This can result, for example, in the wear of a bearing of the rotor shaft and/or to EMC loading in certain frequency ranges.

To avoid such bearing currents, it is known to arrange grounding devices, in particular shaft-grounding rings, on the rotor shaft or on a secondary shaft coupled to the rotor shaft by transmission elements, by way of which the bearing currents are diverted past the bearing.

Furthermore, it is known that during operation the rotor of an electric machine generates heat, which has to be dissipated in order to avoid unacceptably high temperatures, for example by means of an oil flow. Moreover, the bearings for the rotor shaft have to be lubricated and cooled.

US 2021293279A1 discloses an electrically conductive assembly for a bearing, which is arranged around a shaft and accommodated inside a housing, such that the bearing has inner and outer rings and a plurality of roller bodies arranged between the rings, wherein the conductive assembly comprises:

an annular holder which is coupled to the outer bearing ring or to the bearing housing and has a centerline and an open inside end which defines an annular groove; and at least two conductors, each with a radially outer end which is arranged inside the holding groove, and a radially inner end that can make contact with the shaft, each conductor being made of a multiplicity of conductive fibers which are arranged in such manner that they extend inward from the inner end of the holder, wherein the at least two conductors are a distance apart from one another in the circumferential direction around the centerline in order to define at least two axial passages between the holder and the shaft.

WO 2020 234148 A1 discloses a device for the electrically conductive connection between a shaft and a housing in which the shaft is mounted to rotate, which device comprises an electrically conductive holding element and an electrically conductive contact element attached onto the holding element, wherein the contact element is designed to form an electrically conductive connection between the shaft and the holding element whereas the holding element is designed to form an electrically conductive connection between the contact element and the housing, wherein the holding element is attached to the housing by means of a snap ring.

SUMMARY

A purpose of the present invention is to provide a device for grounding a rotatable rotor carrier arranged in a grounded housing, which is improved overall, including the oil-guiding system.

This objective is achieved by a device for grounding a rotor carrier, by a transmission, and by an electric machine as disclosed herein.

Advantageous design features emerge from the claims, the description, and the figures.

The objective is achieved by a device for grounding a rotor carrier, the device comprising a grounded housing and arranged rotatably in the grounded housing a rotor carrier that extends in an axial direction, and further comprising a grounding device and at least one bearing, wherein the rotor carrier is supported relative to the housing by means of the at least one bearing and wherein the housing has a housing arm, wherein on the surroundings side the grounding device is arranged next to the bearing on the housing arm, and wherein the grounding device comprises an electrically conductive, annular carrier element with a central aperture, wherein the carrier element is arranged on the housing arm by way of the central aperture in order to form a permanent electrically conductive connection to an inside surface of the carrier element with the housing arm, and wherein, on the carrier element there is arranged an electrically conductive sliding contact that faces outward in the radial direction in order to form an electrically conductive connection to an outer surface of the sliding contact so that by way of the sliding contact and the carrier element, an electrical connection is formed between the rotor carrier and the housing.

According to the invention, it was recognized that in modern electric drives spark erosion can take place in rotor carriers. To avoid damaging the bearings, grounding paths have to be set up. Conventional grounding rings cannot always be used, since sometimes no contactable uninterrupted surface is available.

A rotor carrier is for example in the form of a rotatable shaft, for example with an attached or hub shaft or another shaft. A housing arm is for example an internal attachment/web/bearing-seat or bearing-holder made integrally with or on the housing.

"Annular" is understood to mean a ring-shaped body. The central aperture is in this case in particular a cut out, specifically a circular cut out, which in particular is arranged centrally in the carrier element.

In this context "on the surrounding side next to the bearing" means an arrangement of the grounding device adjacent to the bearing. Such a bearing can be, for example, a radial bearing, such that the radial bearing is preferably a roller bearing and particularly preferably a deep-groove ball bearing.

According to the invention, it is now provided that by way of its inner lateral surface (the surface facing radially inward) the grounding device is permanently connected to the grounded housing and on its outer lateral surface contacts the rotating rotor/bearing carrier.

Furthermore, the sliding contact can contact the circumferential surface of the rotating rotor/bearing carrier directly, or an electrically conductive sleeve or bush is provided, which is attached to the rotor carrier.

In this case the sliding contact can consist of bristles and/or teeth or the like, or can include these.

This means that—otherwise than provided in the prior art—the sliding contact, i.e., for example the bristles, are not directed radially inward, but radially outward, where they contact the rotor carrier directly or indirectly (for example via an electrically conductive sleeve) to form an electrically conductive connection.

With such a device the rotor/bearing carrier has an uninterrupted cylindrical contact surface for forming a permanent electrically conductive connection. In that way, the current can be drawn off continuously.

Thanks to the central cut out the carrier element can be arranged simply on an already existing housing arm, on which the bearing is also arranged.

The carrier material of the device is made from a conductive material such as aluminum. Likewise, the sliding contact is highly conductive.

In particular the housing arm is of cylindrical shape, at least in the area that contacts the carrier element.

In particular the housing arm is in the form of an internal housing arm that projects at least partially into the rotor carrier, so enabling contact between the sliding contact and the rotor carrier. The dimensions of the housing arm, the grounding device and the rotor carrier are chosen such that the sliding contact contacts the rotor carrier on the inside.

In a further design, the grounding device is in the form of a grounding ring with an annular carrier element and an annular sliding contact. Both the carrier element and also the sliding contact are electrically conductive. For example, bristles or teeth are clamped or bonded to the carrier element as the sliding contact.

In that way, the connection between the sliding contact and the carrier element is also made conductive in a simple manner in order to form the electrical connection between the rotor carrier and the housing.

In a further design, the central cutout, particularly of the grounding ring, is arranged on the housing arm by means of a friction-force connection, for example a press-fit. In that way a conductive connection to the housing arm is established in a simple manner.

In a further design, the rotor carrier has an all-around groove between the bearing and the grounding device. Moreover, the sliding contact has a sliding contact diameter extending in the axial direction while the all-around groove has a groove base and a groove base diameter extending in the axial direction, and wherein the groove base diameter is greater than or equal to the sliding contact diameter.

In a further design, the groove has a groove base and in the groove base there are radial apertures in the rotor carrier. The apertures can be in the form of radial bores. The width of the groove base should be at least as large as the diameter of the apertures.

This means that the rotating rotor/bearing carrier has a groove with bores or apertures between the bearing and the grounding device. These can be distributed equidistantly around the circumference. The groove base diameter, i.e., the diameter of the groove base, is larger than or equal to the contact diameter or the diameter of the sliding contact, whereby an accumulation of oil that might contaminate the sliding contact is prevented. Owing to centrifugal force, oil that is not used for lubricating the bearing (e.g., excess oil) collects in the groove, but it drains away through the bores and, for example, passes into the transmission. This ensures that excess oil is expelled and does not influence the conductive contact between the grounding device and the rotor/bearing carrier.

In a further embodiment, the apertures, i.e., the bores, have an axial diameter by virtue of which draining of a fluid flowing through the groove without any accumulation is enabled. In that way the oil collected can be drained away simply, without oiling (contaminating) the contact surface between the sliding contact and the rotor carrier.

In a further design, a connection point between the grounding device and the housing arm, i.e., the grounding device or the housing arm, has in the axial direction at least one through-going aperture forming a fluidic connection to the at least one bearing or to the groove. In that way the bearing is supplied with oil from outside to lubricate it.

In another embodiment, the at least one through-going aperture is arranged in the housing arm.

In particular, the least one through-going aperture is arranged in the housing arm under the carrier element as a through-going cut out, so that the fluid can flow through under the carrier element.

In that case the aperture can be arranged as an interruption of the press-fit or compressed surface into the housing arm facing toward the carrier element. Thus, a through-going cut out is provided in the housing arm.

In a further, alternative version, the at least one through-going aperture is arranged in the carrier element. In particular, the at least one through-going aperture is arranged in the carrier element as a through-going aperture facing toward the housing arm.

By virtue of such an arrangement, oil can bypass the grounding device due to centrifugal force without contaminating the sliding contact, i.e., the contact element. The oil can cool and lubricate the bearing. Excess oil can drain away through the groove and the bores, i.e., the apertures.

Moreover, a plurality of cut outs can be provided in the carrier element and spaced at equal distances.

In particular, the cut outs have a cross-section designed so that a fluid flowing through, in this case the lubricating and cooling oil, can flow away through the cut outs without accumulating. In that way, contamination of the grounding device with oil, specifically the sliding contact, is prevented.

In particular, the at least one cut out is so designed as to enable an accumulation-free laminar flow of a defined through-flowing fluid, in this case the lubricating and cooling oil. In that way an accumulation can likewise be prevented.

In a further design, the grounding device is arranged on the housing arm on the side of the bearing facing away from the rotor. In that way, a cylindrical, uninterrupted contact surface for the grounding device can be provided on the rotor/bearing carrier.

Furthermore, the objective is also achieved by a transmission for a motor vehicle, with a device as described above for grounding a rotor carrier mounted in a housing of the transmission.

The proposed device can be part of a transmission for a motor vehicle, for example an automatic transmission or an automated transmission. The corresponding rotor carrier, in particular a rotor shaft of the transmission, is mounted to rotate in a housing of the transmission. A further shaft can be connected to the rotor carrier, for example a cardan shaft leading to a differential or a lateral shaft leading to a drive wheel of the motor vehicle.

In addition, the objective is achieved by an electric machine with a rotationally fixed stator and a rotatable rotor, wherein the rotor is coupled to a rotor carrier of the electric machine with a device for grounding the rotor as described above.

The proposed device can be part of an electric machine with a rotationally fixed stator and a rotatably mounted rotor. The rotor is coupled to a rotor carrier. The rotor carrier is grounded relative to a housing of the electric machine by way of the proposed device.

BRIEF DESCRIPTION OF THE DRAWINGS

Further features and advantages of the present invention emerge from the description given below, with reference to the attached figures, which show, schematically in each case.

DETAILED DESCRIPTION

In this case the rotor carrier 3 is in particular in the form of a rotor shaft. In the context of the invention a "rotor shaft" is in principle understood to be a rotatable component which is provided for transmitting a rotation movement between components that are to be coupled to one another. The rotor carrier can even be made integrally with one or both of the components to be coupled. Particularly preferably, the rotor carrier to be grounded is the rotor carrier 3 of an electric machine, which is provided for rotationally fixed connection with a rotor of the electric machine. The rotor and the rotor carrier 3 can also be made integrally, or else as separate individual components connected rotationally fixed to one another. The electric machine can be part of a motor vehicle transmission. However, in principle the rotor carrier 3 can be some other shaft, such as a transmission shaft.

An "axial direction A" corresponds to a direction along a rotation axis of the rotor carrier, whereas "radial" (radial direction R) means an orientation in the diametral direction starting from the rotation axis.

In the context of the invention, an "electrically conductive" connection is understood to be a connection which enables current to flow between the connected components. In the device according to the invention, the electrically conductive connection is formed between the rotor carrier 3 and the housing 5, such that this can be made directly or indirectly, in the latter case via further, intermediate components such as an electrically conductive sleeve on the rotor carrier 3.

The bearing 7, by means of which the rotor carrier 3 to be grounded is mounted rotatably relative to the housing 5, is in particular a radial bearing, this radial bearing preferably being a roller bearing and particularly preferably a deep-groove ball bearing. In the context of the invention, however, the intermediate bearing could also be a roller bearing of some other design such as a roller bearing or even a slide bearing.

It is known that in modern electric drives spark erosion can take place in (rotor) bearings. To avoid damaging the bearings, grounding paths have to be provided. According to the invention, it has been recognized that conventional grounding rings cannot be used in modern electric drives since sometimes no contactable, uninterrupted outer diameter is available.

Figure 1:
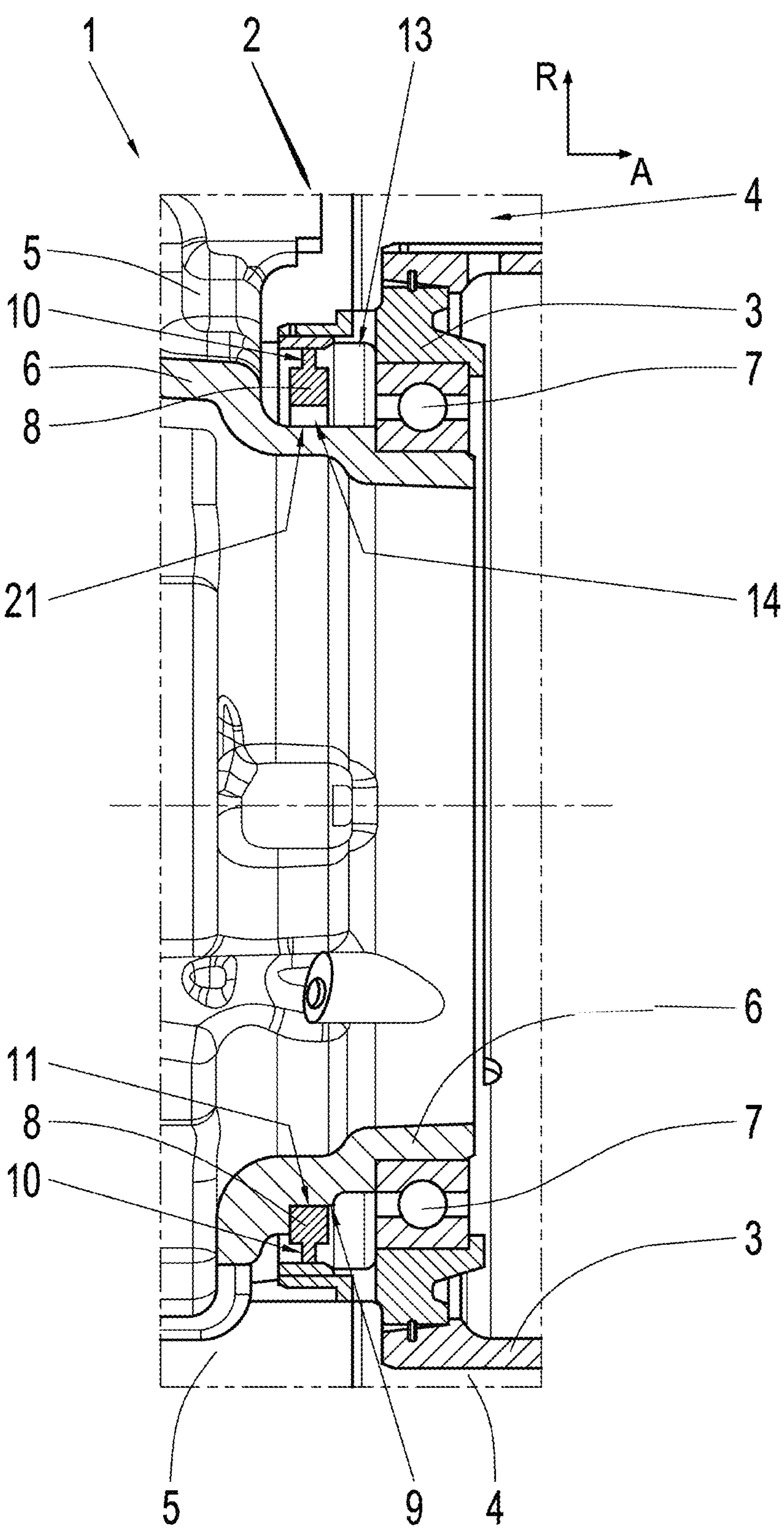
FIG. 1: A device according to the invention in use.
Figure 2:
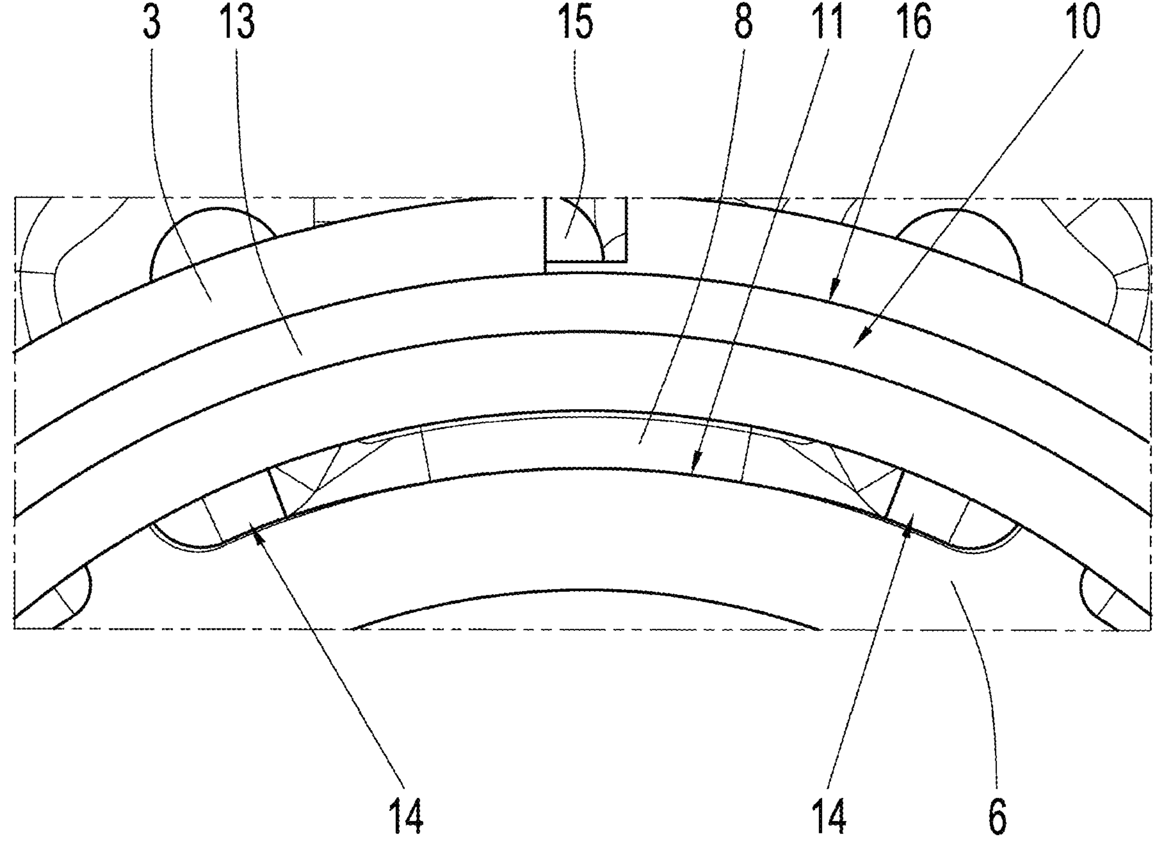
FIG. 2: A device according to the invention, in detail.

FIG. 2 shows a device 1 according to the invention in detail.

This is arranged in an electric machine which comprises a rotor with a rotor carrier 3, in this case in the form of a rotor shaft. The rotor carrier 3 can support a sheet-metal stack 4 as indicated here.

Furthermore, the device 1 comprises a grounded housing 5, which has an interior housing arm 6 in the housing and at least in part in the rotor carrier 3. The housing arm 6 can be in the form of a web/attachment/bearing-seat or bearing holder, and can be made integrally with the housing 5.

In addition, a bearing 7 is present, by means of which the rotor carrier 3 to be grounded is mounted to rotate relative to the housing 5 and by means of which the rotor carrier 3 is supported relative to the housing 5.

In this case the bearing 7 is positioned on the rotor side.

Furthermore, on the surroundings side of the bearing 7 a grounding device is arranged, which comprises an electrically conductive annular carrier element 8 wherein the carrier element 8 has a central cut out 9.

In this case the carrier element 8 consists of a conductive material, for example aluminum.

By virtue of the central cut out the carrier element is arranged on the housing arm 6, for example pressed onto it with a press fit. Thereby, a simple electrically conductive connection between the carrier element 8 and the dissipative housing 5 is produced. Likewise, thereby the annular carrier element 8 is attached in a simple manner to the housing arm 6 and thus to the housing 5.

This means that the carrier element 8 is connected to the housing arm 6 by way of the central cut out 9, to form a permanent conductive connection to an inner lateral surface, for example the inside diameter 11 of the carrier element 8, to the housing arm 6.

Moreover, on the carrier element 8 and directed radially away from it there is an annular sliding contact 10, for example consisting of bristles, teeth, etc. The sliding contact 10 contacts the rotor carrier 3, whereby contact to an uninterrupted cylindrical contact surface is obtained.

The sliding contact 10 is, for example, clamped, bonded, or attached in some other way to the carrier element 8. In that case, the connection of the sliding contact 10 to the carrier element 8 is highly conductive.

This means that in the radial direction R the electrically conductive sliding contact 10 is arranged on the carrier element 8 directed radially outward in order to form an electrically conductive connection with an outside surface, at the outer diameter 12 of the grounding device, to the rotor carrier 8, so that by way of the sliding contact 10 and the carrier element 8 an electrical connection between the rotor carrier 3 and the housing 5 is formed.

Thus, the grounding device is connected permanently at the inside diameter 11 to the grounded housing or the housing arm 6. At the outer diameter 12 or the outside, the grounding device makes contact with the rotating rotor/bearing carrier 3.

In that way, an electrically conductive connection between the rotor carrier 3 and the housing 5 is produced.

Between the grounding device and the bearing 7 an all-around groove 13 is formed in the rotor carrier 3.

In order to be able to supply the bearing 7 with oil, the housing arm 6 is interrupted under the carrier element 8.

For that purpose, in the axial direction A there are apertures which in particular are in the form of through-going cut outs 14. The cut outs 14 in the housing arm 6 are directed toward the carrier element 8.

The cut outs 14 can be in the form of interruptions of the press-fit or compressed surface between the carrier element 8 and the housing arm 6. A plurality of cut outs 14 spaced equal distances apart can be provided in the housing arm 6.

By virtue of such an arrangement oil can bypass the grounding device due to gravity without contaminating the sliding contact 10, i.e., the contact element. The oil can cool and lubricate the bearing. Excess oil can pass into the groove 13 or is captured by the groove.

This means that the housing arm 6 has cut outs 14 for forming a fluidic connection to the at least one bearing 7 and to the groove 13. In that way the bearing 7 is supplied with oil to lubricate it.

The cut outs 14 have a cross-section chosen such that the cooling oil passing through the cut outs 14 can flow through without accumulating.

For that purpose, the cut outs 14 are designed so as to enable laminar flow of the through-flowing cooling oil.

For a laminar gap flow $Q_L$ through a cut out 14 the following equation applies:

$$Q_L = \frac{\pi * d_m * h^3 * \Delta_p}{12 * \eta * l}$$

in which $\Delta_p$ is the static pressure difference, $\eta$ is the viscosity, l is the length, h is the height of the cut out 14, and $d_m$ is the cross-section diameter of the cut out 14.

In that way, the through-flowing oil passes through the internal diameter 11 without accumulating to supply the bearing 7 with oil. Excess oil collects in the groove 13.

Furthermore, the groove 13 has a groove base such that in the grove base 16 bores 15 (FIG. 2) are provided in the rotor carrier 3. These can be distributed equidistantly around the periphery. The groove base diameter is larger than the contact diameter, so that an accumulation of the oil is prevented.

Owing to the centrifugal force, oil that is not used for lubricating the bearing 7 (excess oil) collects in the groove 13 and drains away through the bores 15 and, for example, passes into the transmission. This ensures that excess oil is expelled and does not affect the conductive contact between the grounding device and the rotor carrier 3.

Through the cut outs 14 in the press-fit surface (outer diameter 12) of the housing arm 6, oil can bypass the grounding device by virtue of gravity without contaminating the contact element, i.e., the sliding contact, and can then cool and lubricate the bearing 7. In that way contamination of the grounding device with oil, in particular the sliding contact 10, is prevented.

Thus, the sliding contact 10 can largely be kept free from oil. This improves the electrical contact between the sliding contact 10 and the rotor carrier 3.

FIG. 2 shows in detail the cut outs 14 in the press-fit surface (outer diameter 12) of the housing arm 6, the sliding contact 10, and also the groove 13 in the rotor carrier 3. By virtue of centrifugal force, the oil collects in the groove 13. The oil flowing through the cut outs 14, under the action of gravity, can bypass the grounding device without contaminating the contact element, i.e., the sliding contact 10, and can then cool and lubricate the bearing 7.

The cross-section or diameter of the cut outs 14 is chosen such that the quantity of oil required for lubricating and cooling the bearing 7 can reach the bearing 7 without accumulating. Likewise, the number of cut outs 14 is chosen with the same thing in mind. In turn, that depends on the quantity of oil needed and available.

Furthermore, the bores 15 are present to drain away the oil that flows through the cut outs 14 and then collects in the groove 13.

The groove base diameter is larger than the contact diameter. In that way the sliding contact 10 is not contaminated with accumulated oil.

This ensures that excess oil is spun off and does not affect the conductive contact between the grounding device and the rotor carrier 3.

By virtue of such a device 1 according to the invention, otherwise than is usually provided in the prior art, the sliding contact 10, i.e., for example the bristles are directed not radially inward but radially outward, where they contact the rotor carrier 3 directly or indirectly (for example via an electrically conductive sleeve) in order to form an electrically conductive connection. Thus, via its inner lateral surface (its radially inside-facing surface) the grounding device is permanently connected to the grounded housing 5 and contacts the rotating rotor/bearing carrier 3 via its outer lateral surface.

By virtue of such a device 1, the rotor carrier 3 has an uninterrupted cylindrical contact surface for the establishment of a permanent electrically conductive contact. In that way, it is ensured that the current is conducted away continuously.

LIST OF INDEXES

1 Device
2 Electric machine
3 Rotor carrier
4 Sheet-metal stack
5 Housing
6 Housing arm
7 Bearing
8 Carrier element
9 Central cut out
10 Sliding contact
11 Inside diameter
12 Outer diameter
13 Groove
14 Cut out
15 Bore
16 Groove base
A Axial direction
R Radial direction

The invention claimed is:

1. A device for grounding a rotor carrier, the device comprising:

a grounded housing;

a rotor carrier arranged rotatably in the grounded housing, the rotor carrier extending in an axial direction;

a grounding device; and at least one bearing, wherein the rotor carrier is supported relative to the housing by means of the at least one bearing, wherein:

the housing has a housing arm;

the grounding device is arranged on the housing arm next to the bearing on a surrounding side, wherein the grounding device comprises an electrically conductive annular carrier element with a central cut out, the carrier element being arranged on the housing arm by way of the central cut out in order to form a permanent electrically conductive connection to the housing arm at an inner surface of the carrier element; and the carrier element has an electrically conductive sliding contact facing outward in the radial direction and is arranged in order to form an electrically conductive connection at an outer surface between the sliding contact and the rotor carrier so that by way of the sliding contact and the carrier element an electrical connection is formed between the rotor carrier and the housing.

2. The device according to claim 1, wherein the housing arm is in the form of an internal housing arm that projects at least in part into the rotor carrier, so that contact between the sliding contact and the rotor carrier is enabled.

3. The device according to claim 1, wherein the central cut out is held on the housing arm with a frictional connection.

4. The device according to claim 1, wherein the rotor carrier has an all-around groove between the bearing and the grounding device.

5. The device according to claim 4, wherein the sliding contact has a sliding contact diameter extending in the axial direction and the all-around groove has a groove base with a groove base diameter extending in the axial direction, wherein the groove base diameter is larger than or equal to the diameter of the sliding contact.

6. The device according to claim 5, wherein the all-around groove has a groove base and wherein radial apertures are provided in the groove base in the rotor carrier.

7. The device according to claim 1, wherein a connection point between the grounding device and the housing arm in the axial direction has at least one through-going perforation so as to form a fluidic connection to the at least one bearing.

8. The device according to claim 7, wherein the at least one through-going perforation is defined in the carrier element.

9. The device according to claim 8, wherein the at least one through-going perforation in the carrier element is in the form of a through-going cut out extending toward the housing arm.

10. The device according to claim 7, wherein the at least one through-going perforation in the housing arm extends toward the carrier element.

11. The device according to claim 10, wherein the at least one through-going perforation in the housing arm is defined under the carrier element in the form of a through-going cut out, so that fluid can flow through under the carrier element.

12. The device according to claim 11, wherein a plurality of cut outs spaced equally apart are provided in the housing arm.

13. The device according to claim 12, wherein the at least one cut out is configured such that a defined through-flowing fluid can flow through without accumulating.

14. The device according to claim 1, wherein the grounding device is arranged on the housing arm on a side of the bearing facing away from the rotor.

15. A transmission for a motor vehicle, comprising the device according to claim 1 for grounding a rotor carrier, wherein the device is mounted inside a housing of the transmission.

16. An electric machine comprising:

a housing;

a rotationally fixed stator; and a rotor carrier mounted inside the housing;

a rotatable rotor coupled to the rotor carrier; and the device according to claim 1 for grounding the rotor.

* * * * *